United States Patent
Coles et al.

(10) Patent No.: US 7,623,214 B2
(45) Date of Patent: Nov. 24, 2009

(54) LIQUID CRYSTAL MATERIALS

(75) Inventors: Harry Coles, Cambridgeshire (GB);
Mykhaylo Pivnenko, Cambridge (GB);
Jonathan Hannington, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 589 days.

(21) Appl. No.: 10/584,791

(22) PCT Filed: Jan. 26, 2005

(86) PCT No.: PCT/US2005/002505

§ 371 (c)(1),
(2), (4) Date: Jun. 28, 2006

(87) PCT Pub. No.: WO2005/075603

PCT Pub. Date: Aug. 18, 2005

(65) Prior Publication Data
US 2009/0115957 A1    May 7, 2009

(30) Foreign Application Priority Data
Jan. 30, 2004    (GB)    ................... 0402006.1

(51) Int. Cl.
*C09K 19/02*    (2006.01)
(52) U.S. Cl. .................. 349/182; 349/168; 428/1.1; 252/299.01
(58) Field of Classification Search ............... 349/184, 349/185, 186, 171, 172, 175, 177, 179, 86, 349/88, 182, 188; 428/1.1; 252/299.01, 252/299.6, 299.66, 299.67
See application file for complete search history.

(56) References Cited

U.S. PATENT DOCUMENTS

| 4,767,194 A | 8/1988 | Heppke et al. |
| 5,455,697 A | 10/1995 | Coles et al. |
| 6,424,755 B1 | 7/2002 | Clapp |
| 7,041,348 B2 * | 5/2006 | Ionescu ..................... 428/1.3 |

FOREIGN PATENT DOCUMENTS

| EP | 1477547 A1 | 11/2004 |
| EP | 1408098 B1 | 12/2005 |
| GB | 316825 | 8/1929 |
| GB | 2356629 | 5/2001 |
| WO | WO 98/00428 | 1/1998 |

OTHER PUBLICATIONS

"Polymer-Stabilized Liquid Crystal Blue Phases," W. Cao, Nature Materials, vol. 1, Oct. 2002, pp. 111-113.
"Lasing in a Three-Dimensional Photonic Crystal of the Liquid Crystal Blue Phase", W. Cao, et. al., Natura Materials, vol. 1, Sep. 2002, pp. 64-68.

* cited by examiner

*Primary Examiner*—Thoi V Duong
(74) *Attorney, Agent, or Firm*—Timothy J. Troy (57) ABSTRACT

A blue phase liquid crystalline material comprising a mixture comprising at least one bimesogenic compound and at least one chiral compound, wherein the material is capable of stable existence in the blue phase over a temperature range of at least 5° C. A process for the preparation of the above blue phase liquid crystalline material, an optical device comprising it, a process of mirrorless lasing and a slotted monolithic optical waveguide using it are also disclosed.

13 Claims, 8 Drawing Sheets

LIQUID CRYSTAL MATERIALS

CROSS-REFERENCE TO RELATED APPLICATIONS

This application is a U.S. national stage filing under 35 U.S.C. § 371 of PCT Application No. PCT/US2005/002505 filed on Jan. 26, 2005, currently pending, which claims the benefit of G.B. Patent Application No. 0402006.1 filed Jan. 30, 2004 under 35 U.S.C. § 119 (e). PCT Application No. PCT/US2005/002505 and G.B. Patent Application No. 0402006.1 are hereby incorporated by reference.

FIELD OF THE INVENTION

This invention relates to liquid crystalline materials, and in particular to blue phase liquid crystalline materials, their preparation and to optical devices and processes using the blue phase liquid crystalline materials.

Blue phase liquid crystalline materials exhibit modulated defect lattice phases with cubic symmetry where the lattice parameter can be of the order of the wavelength of visible light (hundreds of nanometres nm). They are formed from some highly chiral nematic liquid crystal systems and comprise complicated, orientally ordered twisted structures such as a double twist structure. For example, the liquid crystals can pack to form double twist cylinders, which in turn pack into cubic structures. The three-dimensional cubic structures have lattice periods of several hundred nm and exhibit selective Bragg reflections in the range of visible light. As disclosed in 'Kirk-Othmer Encyclopaedia of Chemical Technology' $4^{th}$ edition, Volume 15, published by Wiley-Interscience in 1995, blue phases occur in a narrow temperature range, seldom wider than 1° C.

BACKGROUND TO THE INVENTION

Blue phases are virtually non-birefringent, but they exhibit the selective reflection of circularly polarised light, observed in chiral nematic phases. Whilst they are considered to be optically isotropic, they can become biaxial in the presence of an applied electric field, leading to field dependent optical density changes for incident light. These electro-optical effects can be viewed without the use of polarisers and with response times of 1 to 50 ms, depending on temperature.

U.S. Pat. No. 4,767,194 describes an optical system containing a blue phase liquid crystal layer in a cell to which an electric field can be applied transversely to the plane of the layer. A light source sends to the cell a beam of rays parallel to the field direction. The blue phase material is designed such that no selective reflection takes place for the light that is incident upon the device. The cell is optically isotropic in the presence of an electric field, switches rapidly and needs no interface orientation, and is suggested for use in intensity modulation of light of a given wavelength, or as a phase grid in a schlieren-optical system, an etalon in a laser, or a light switch. The blue phases of the liquid crystal materials of U.S. Pat. No. 4,767,194 are only described as exhibiting blue phases over narrow temperature ranges, for example BP I from 26 C. to 27 C., BP II from 27 C. to 28 C.

A paper by W. Cao et al in Nature Materials, Vol. 1, October 2002 at pages 111-113 describes mirrorless lasing in a 3-dimensional photonic band-gap, based on a blue phase liquid crystal material. This paper describes simultaneous lasing in 3-dimensions for a dye doped material in the BP II phase. The BP II liquid crystal phase is observed over the temperature range 23.6 C. to 24.4 C.

These devices based on blue phase liquid crystalline materials are of commercial interest, but commercial use has been restricted by the narrow operating temperature ranges of known blue phase liquid crystalline materials.

H. Kikuchi et al describe a method of broadening the temperature range of the blue phase BP I in Nature Materials, Vol. 1, September 2002 at pages 64-68. This paper describes the stabilisation of blue phases by polymer liquid crystal composites prepared by photopolymerisation of acrylate monomers in monomer/photoinitiator/liquid crystal mixtures in a blue phase state.

New formulations exhibiting broad temperature range blue phases, without needing to be stabilised as a composite, are the subject of the present invention.

SUMMARY OF THE INVENTION

A blue phase liquid crystalline material according to the invention is a mixture of at least one bimesogenic compound and at least one chiral compound and which is capable of stable existence in the blue phase over a temperature range of at least 5° C.

In a process according to the invention for the preparation of a blue phase liquid crystalline material which is capable of stable existence in the blue phase over a temperature range of at least 5° C., a mixture of at least one bimesogenic compound and at least one chiral compound is cooled from the isotropic state.

We have found that blue phases can be observed for mixtures of bimesogenic nematic and chiral compounds. Such materials may pass through three successive blue phases (Blue Phase III, Blue Phase II and Blue Phase I) as they are cooled. The sequence of blue phases observed is dependent upon the type and amount of chiral compound used in the formulation. The process of the present invention generally leads to the Blue Phase I (a face-centred cubic modulated defect lattice) stable over a wide temperature range.

The blue phase liquid crystalline materials of the invention are usually capable of stable existence in the blue phase BP I over a temperature range of at least 10 or 20° C. and are often capable of stable existence in the blue phase BP I over a temperature range of at least 35° C. or even 50° C., and in some cases are also capable of stable existence in the blue phase BP I at a temperature below 35° C. or even below 20° C. These properties are great advantages for the incorporation of the blue phase liquid crystalline materials in optical devices for commercial use. In general the blue phase BP I is stable between the temperature at which it is formed by cooling from the isotropic state and a lower temperature which is the temperature at which the blue phase BP I converts to a phase which is stable phase at lower temperatures, usually a smectic phase.

DETAILED DESCRIPTION OF THE INVENTION

The mixture of at least one bimesogenic compound and at least one chiral compound that is cooled from the isotropic state to form the blue phase liquid crystalline material can simply be a mixture of one bimesogenic nematic compound and a chiral compound. The mixture can advantageously be a mixture of at least two bimesogenic nematic compounds and at least one chiral nematic compound. Mixtures of bimesogenic nematic compounds can show liquid crystalline properties while having a reduced melting point compared to single compounds. Mixtures of bimesogenic nematic compounds and at least one chiral nematic compound also generally form blue phase BP I which is stable over a greater temperature range and at a lower temperature (until formation of a smectic phase at 15-40° C.) than mixtures containing only one bimesogenic nematic compound. The mixture can be a mixture of at least two bimesogenic nematic compounds, at least one of which is chiral.

The, or each, bimesogenic nematic compound is generally of the formula M-A-M', where A is a flexible chemical linkage and each of M and M', which can be the same or different, is a mesogen comprising at least 2, preferably 2, 3 or 4 aromatic, heterocyclic or cycloaliphatic nuclei joined by a more rigid linkage.

The flexible chemical linkage A generally comprises linkages selected from alkylene, ether and sulphide linkages and preferably separates the mesogens M and M' by a chain of at least 6 atoms. The alkylene linkages are preferably —$CH_2$—. The flexible chemical linkage can for example be of the formula (—$CH_2$—)$_x$ where x is 6-18, or —O—($CH_2$)$_y$—O—, where y is 4-18, or —O—($CH_2$)$_z$)$_c$—O—, where z is 2-4 and c is 2-6. The flexible chemical linkage A can be bonded directly to an aromatic nucleus of a mesogen group M or M' or can be bonded through a chemical linkage such as an ester, carbonate or amide linkage. The flexible linkage A can for example be of the form —OOC($CH_2$)$_a$COO where a is 4 to 18, preferably 6-12.

The aromatic, heterocyclic or cycloaliphatic nuclei in each mesogen group M or M' are preferably benzene nuclei, particularly 1,4-phenylene moieties, but can include naphthalene, particularly naphthalene-2,6-diyl, or other fused ring nuclei, e.g. 1,2,3,4-tetrahydronaphthalene-2,6-diyl, aromatic heterocyclic nuclei in which one or more CH groups of benzene is replaced by N such as pyridine, or pyrimidine, cycloaliphatic rings such as trans-1,4-cyclohexylene, 1,4-cyclohexenylene, 1,4-bicyclo-(2,2,2)-octylene, decahydronaphthalene-2,6-diyl, cyclobutane-1,3-diyl, spiro[3.3]heptane-2,6-diyl or dispiro[3.1.3.1]decane-2,8-diyl, or other heterocyclic groups such as a trans-1,4-cyclohexylene group in which one or two non-adjacent $CH_2$ groups are replaced by N, O and/or S, for example piperidine-1,4-diyl. The mesogen group can for example be an optionally substituted biphenyl group or a group of the formula —Ar—B—Ar or —Ar—B—Ar—B—Ar, where each Ar is an optionally substituted aromatic group and B is a linkage selected from carbonyl, ester, carbonate, amide, azo, —$CH_2$—, —$CH_2$—$CH_2$.— CH=CH—, —C≡C—, —O—, —O—$CH_2$—, —$CF_2CF_2$—, —CF=CF—, —CH=CH—COO and —S— linkages.

Preferably, M and M' each contain at least one aromatic nucleus substituted by an electronegative group such as —F, —Cl, —CN, —NO2, —NCS, —SCN, —OCN or a further aromatic ring. The electronegative group is preferably in the 4'-position in the mesogen group with respect to the flexible chemical linkage A. M and/or M' can additionally or alternatively be substituted by one or more alkyl, alkoxy, alkylcarbonyl or alkoxycarbonyl groups in which the alkyl is of 1 to 7 carbon atoms and may be substituted by one or more F or Cl atom.

In many cases the mesogen groups M and/or M' preferably additionally contain at least one sterically hindering moiety, for example a halogen atom, preferably fluorine but alternatively chlorine or bromine, a branched alkyl group, for example a tertiary alkyl group such as t-butyl, or a cycloalkyl group. Incorporation of a sterically hindering moiety tends to reduce the temperature of the phase transitions between the isotropic and blue phase and between the blue phase and the smectic phase, so that the blue phase is stable at more useful temperatures. Thus in a preferred blue phase liquid crystalline material, M and M' are each substituted biphenyl groups of the formula in which at least one of the groups X is a sterically hindering moiety, the other groups X being selected from H and alkyl, and Q is an electronegative moiety. For example the electronegative moiety may be selected from a fluorine atom, a cyano group or a further aromatic ring, and the mesogen may contain a fluorine atom substituted in the other ring of the mesogen, with the other groups X being H. Examples of suitable mesogen groups include 3,4'-difluorobiphenyl, and 3-fluoro-4'-cyanobiphenyl. The bimesogenic nematic compound can for example be one or more compound of the formula where n is in the range 4 to 15, preferably 5 to 12

For some uses it is preferred that the bimesogenic nematic compound comprises a dye compound having a chromophore group. If the bimesogenic nematic compound comprises a dye compound, the properties of the blue phase such as colour, refractive index and/or crystal orientation are affected by illuminating the mixture of the bimesogenic compound and the chiral compound while it is being cooled from the isotropic state. Many chromophore groups are also mesogen groups, for example a substituted diazobenzene group such as a p-nitrodiazobenzene group can act as both chromophore and as one of the mesogen groups of the bimesogenic nematic compound.

Examples of bimesogenic nematic compounds having a chromophore group include those of the formula where m is in the range 4 to 15. Such a bimesogenic dye compound can be used as the only bimesogenic nematic compound in the mixture or alternatively can be present together with at least one non-chromophoric bimesogenic nematic compound, for example a compound of the formula as described above.

Further examples of suitable bimesogenic nematic compounds are those described in GB-A-2356629.

The chiral compound is preferably miscible with the bimesogenic nematic compound to produce a mixture which is optically clear in the isotropic state. The chiral compound preferably has a helical twisting power (HTP) in the range 20 to 100 µm$^{-1}$ or even higher. The chiral compound is preferably a chiral nematic compound. The chiral nematic compound generally includes a chiral centre (asymmetric carbon atom) and at least one mesogen which usually comprises at least 2 aromatic nuclei joined by a relatively rigid linkage, for example an optionally substituted biphenyl group or a group of the formula —Ar—B—Ar, where each Ar is an optionally substituted aromatic group and B is a linkage selected from carbonyl, ester, carbonate, amide, azo, —CH$_2$—, —CH$_2$—CH$_2$. —CH=CH—, —C≡C—, —O— and —S— linkages.

The chiral compound can for example be materials which are sold by Merck under the trade names 'BDH1281' or 'BDH1305', or .bisfurans substituted by a mesogen group as described in WO-A-98/00428. Preferred compounds of high HTP include those of the formula alkoxy or alkanoyl of 1 to 12 carbon atoms. For example BDH1281 is believed to have the structure The chiral compound can for example form 0.5 to 25% by weight, particularly 1 to 10% by weight of the liquid crystalline material. The chiral compound acts as a dopant for orientation of the bimesogenic nematic compound in an ordered twisted structure. The proportion of chiral compound required is generally lower within the ranges quoted above if its helical twisting power (HTP) is high. The HTP of the chiral compound multiplied by the proportion in which it is present in the mixture ("the HTP of the mixture") which is cooled from the isotropic state is preferably in the range 3 to 5 µm$^{-1}$; for example a chiral compound of HTP 100 µm$^{-1}$ is preferably used as 3 to 5% by weight of the mixture whereas a chiral compound of HTP 50 µm$^{-1}$ is preferably used as 6 to 10% of the mixture.

Chiral nematic compounds having high compatibility with the bimesogenic nematic compound can be used at over 25% by weight of the mixture if necessary to achieve the required HTP of the mixture. If the bimesogenic nematic compound is itself chiral, it may act as both the bimesogenic and the chiral component of the mixture, i.e. it can be used alone. Examples of suitable bimesogenic chiral nematic compounds are those and those of the formula including the respective (S,S) enantiomer, wherein E and F are each independently 1,4-phenylene (optionally substituted) or trans-1,4-cyclohexylene, v is 0 or 1, Z is —COO—, —OCO—, —CH2CH2- or a single bond and R is alkyl, of the formula M-A*-M', where M and M' are defined as above and A* is a flexible chemical linkage containing an asymmetrically substituted carbon atom. One example of such a structure is shown below.

Thus according to another aspect of the invention a blue phase liquid crystalline material is a bimesogenic chiral nematic compound and is capable of stable existence in the blue phase over a temperature range of at least 5° C. If the bimesogenic chiral nematic compound is used alone to form the blue phase, it preferably has a HTP of 3 to 5 μM$^{-1}$.

The mixture of bimesogenic nematic and chiral compounds, or the bimesogenic chiral nematic compound, can contain a minor proportion of a nematic compound containing only one mesogen, but preferably contains less than 20% by weight, for example 1 to 20%, of such a monomesogen.

The blue phase liquid crystalline material is prepared by heating the mixture of bimesogenic nematic and chiral compounds described above, or the bimesogenic chiral nematic compound, to a temperature above the transition temperature from the nematic to the isotropic phase, and cooling the resulting isotropic phase. The mixture of bimesogenic nematic and chiral compounds is preferably cooled slowly at less than 5° C. per minute, most preferably at a rate of no more than 1° C. per minute, for example about 0.5° C. per minute.

The mixture of bimesogenic nematic and chiral compounds is preferably enclosed between surfaces which induce homeotropic orientation at the interfaces while it is heated and cooled. Examples of materials that induce homeotropic alignment (the long axis of the liquid crystal is perpendicular to the surface) include: lecithin, clean glass, siloxanes, indium tin oxide (ITO) and evaporated SiO. For example, we have found experimentally that the wide temperature range blue phase BP I, of the invention, is stable after formation between clean glass plates or ITO layers. The broad temperature blue phase is not observed under conditions of strong planar alignment, for example when the mixture of bimesogenic nematic and chiral compounds is enclosed between surfaces such as polyimide or polyamide. Thus if the mixture of bimesogenic nematic and chiral compounds is cooled slowly in a layer 1 or 2 μm thick in a conventional polyimide cell, the blue phase produced is only stable over a temperature range of less than 5-° C., whilst in a clean glass cell the stable blue phase is produced. In a thicker cell, for example a layer of 5 μm up to 100 μm thick, where the influence of surface imposed alignment is reduced a stable blue phase can generally be observed.

If the wide temperature blues phase, BP I, is damaged, (for example by cooling into a smectic phase and then reheating, or by strong shearing, or by a strong electric field) then a chiral nematic phase can be observed with a conventional narrow blue phase existing between that chiral nematic phase and the isotropic phase. The broad temperature range blue phase can then be regenerated by cooling from the isotropic phase.

In one preferred process according to the invention, the mixture of bimesogenic and chiral compounds includes at least one compound containing a chromophore as described above and is illuminated in selected areas with visible light, for example green or blue light, or UV light, while it is cooled from the isotropic state, whereby the blue phase liquid crystalline material differs in colour, orientation or refractive index between the illuminated and non-illuminated areas.

In another preferred process according to the invention, the mixture of bimesogenic nematic and chiral compounds is cooled from the isotropic phase while in contact with a patterned surface having alternating lines of a surface such as glass promoting homeotropic alignment and a surface such as polyimide promoting planar alignment. The width of the alternating lines is similar to the repeating pitch of the blue phase formed from that mixture of bimesogenic nematic and chiral compounds, which is typically in the range 0.3 to 0.5 μm.

The blue phase liquid crystalline material is virtually non-birefringent, but it exhibits the selective reflection of circularly polarised light, observed in chiral nematic phases. Whilst the blue phase is considered to be optically isotropic, it can become biaxial in the presence of an applied electric field, leading to field dependent optical density changes for incident light. Devices employing blue phases may not require polarisers to observe the electro-optic effect and can thus be used in light efficient mode. They are polarisation independent and can respond to electric fields in two ways: a slow response, typically occurring in 50 ms (milliseconds) results from a change in the lattice parameters of the Blue Phase, whilst a faster response, typically occurring in 1 ms, results in a change in refractive index. The lattice structure self assembles and can be formed in large domains (e.g. many microns wide) without the need for surface alignment for the electro-optic device effect.

The blue phase liquid crystalline material of the invention can be used in various optical devices. The blue phase can be used to control the phase and amplitude of electromagnetic radiation, particularly visible light and UV radiation, for example in response to an applied electric field, magnetic field or incident light. The ability of the blue phase to self assemble in large domain lattice structures provides a route to liquid crystal phases that can be integrated into planar lightwave circuits enabling the phase and amplitude of light to be modulated. In common with chiral nematic phases, the blue phase can be used to reflect light, and the wavelength can be tuned using voltage or temperature. The mode of reflection of light by the blue phase depends on the rate of cooling of the mixture of bimesogenic nematic and chiral compounds in forming the blue phase. The light reflection can be broad (polydomain) or narrow (single domain) band depending on the cooling rate used to form the blue phase. For example, generally broad band light reflection can be achieved by cooling at a rate of about 0.5-5.0° C. per minute, while narrow band light reflection can be achieved by cooling at a rate of about 0.001-0.01° C. per minute.

Usually the optical device comprises a layer of blue phase liquid crystalline material enclosed between opposed carrier plates. The construction of a simple optical cell is shown for example in FIG. 1 of U.S. Pat. No. 5,455,697. A liquid crystal material (in the present invention the blue phase material) is interposed between a pair of substrates which may be constructed of glass or a suitable polymer. The inner surfaces of the substrates are coated with a transparent conducting film of ITO. Spacers, which may be polymeric films or glass beads, define the cell thickness. An AC voltage source can be operationally connected to the carrier plates to apply the electric field. A light source can be positioned to impinge a beam of light onto the layer of blue phase liquid crystalline material. The light source is usually applied in a direction substantially normal to the plates (parallel to the electric field) but may be at an angle to the plates.

The optical device can for example be a light valve for intensity modulation of radiation of a particular wavelength, a diffraction grid in a schlieren-optical system, a tuner, particularly for light produced in a laser, a lens of variable focal length or as a light switch with a field-controlled total reflection angle. In such optical devices, no alignment layers or polarisers (which are essential for current commercial liquid crystal display devices) are required for devices based on the blue phase liquid crystalline material. This is a particular advantage for application in planar lightwave circuits, where alignment and polarisers are not practical. The devices based on the blue phase liquid crystalline material also have advantages as low insertion loss photonic devices and high brightness displays (no polarisers required) and in ease of manufacture.

Another preferred optical device is a slotted monolithic optical waveguide having an electro-optically active material positioned in a slot between two portions of the waveguide and electrodes deployed above the slot to adjust the phase of light travelling in the waveguide, characterised in that the electro-optically active material is a blue phase liquid crystalline material according to the present invention. A slotted monolithic optical waveguide is described for example in U.S. Pat. No. 6,424,755. The slot can be a rectangular slot between two portions of the waveguide with rectangular electrodes deployed above the rectangular slot, as described in U.S. Pat. No. 6,424,755, or a slot having at least one curved edge as described in GB Application 0316825.9.

The reflective properties of the blue phase liquid crystalline material of the invention can be used in applications such as sensors, security/brand protection, optical films.

The blue phase liquid crystalline material of the invention can be used in photorefractometry for data storage and holography purposes.

When doped with a suitable dye, the blue phase liquid crystalline material of the invention can also be used in mirrorless lasing. A sample of the dye-doped blue phase liquid crystalline material can be optically pumped by irradiation with high energy pulsed radiation, for example from a laser, at a wavelength in the visible spectrum. As the pump energy is increased, first stimulated emission, then lasing is observed. The laser emission is circularly polarized and can be tuned by external stimuli, such as electric fields, magnetic fields, changes in temperature etc.

The blue phase liquid crystalline material of the invention formed from a mixture of bimesogenic and chiral compounds including at least one compound containing a chromophore can be used as a rewritable information storage medium. Information is recorded by illuminating in selected areas with visible or UV light while cooling the mixture of bimesogenic and chiral compounds from the isotropic state. The blue phase liquid crystalline material of the invention formed from a mixture of bimesogenic and chiral compounds including at least one compound containing a chromophore also typically fluoresce in the upper end of the visible spectrum, which can be used in applications such as sensors, security and/or brand protection and optical films.

The blue phase liquid crystalline material can if desired be immobilised in a soft gel polymer matrix for more convenient use in such optical devices. One component of the liquid crystalline material can itself be lightly crosslinked to form an internal polymer network, or the liquid crystalline material can be dispersed in a polymer solution which is crosslinked to form a gel. An internal polymer network can for example be formed by inclusion of a Si—H group in a siloxane flexible chemical linkage A, which can be crosslinked by a hydrosilylation reaction with a divinyl compound such as an alpha, omega-diene, for example 1,5-hexadiene or 1,7-octadiene, or a dimethylvinyl-terminated polydimethylsiloxane. An acrylic or vinyl polymer solution can be gelled by a comonomer having two polymerisable unsaturated groups, for example a diacrylate, or by reaction of pendant functional groups, for example an epoxy-functional acrylate such as Norland (Trade mark) optical adhesive can be gelled by an amine. A siloxane polymer solution can be gelled by hydrosilylation. One or more component of the liquid crystalline material can in some cases be grafted onto a polymer to form a gel using hydrosilylation. The polymer gel network preferably has a low concentration of crosslinks in the polymer and/or a low concentration of polymer in the solution that is gelled. The gelation reaction is preferably carried out after the blue phase has been formed.

The invention is illustrated by the following Examples, in which parts and percentages are by weight. These will be described with reference to the accompanying drawings, in which.

EXAMPLE 1

10% of the bimesogenic nematic compound was mixed with 40% of the bimesogenic nematic compound and 50% of the bimesogenic nematic dye compound and 3.7% of the chiral nematic compound 'BDH1281'. The mixture was sealed between non-treated glass plates as a layer 3 μm thick and heated to above 80° C. to form the isotropic phase and was cooled below 80° C. at 0.5° C. per minute. Formation of a blue phase at 78.3° C. was detected by polarising microscopy. The blue phase can also be detected by observing selective reflectancy at a particular wavelength and distinctive diffraction of light of a particular frequency. This blue phase was stable at temperatures below 78° C. down to below 30° C. At a temperature of about 26° C. it converted to the chiral nematic phase and then to the smectic phase which is the stable phase at temperatures below 26° C.

The selective reflection of the blue phase liquid crystalline material was investigated by measuring the % of incident light reflected by the cell of blue phase liquid crystalline material between glass plates at wavelengths between 450 and 650 nm (due to the absorption band of the bimesogenic nematic dye compound it is impossible to observe selective reflection at wavelength shorter than 450 nm). This measurement was made during cooling at temperatures of 79.0, 78.6, 77.5, 72, 60 and 30° C.

Figure 1:
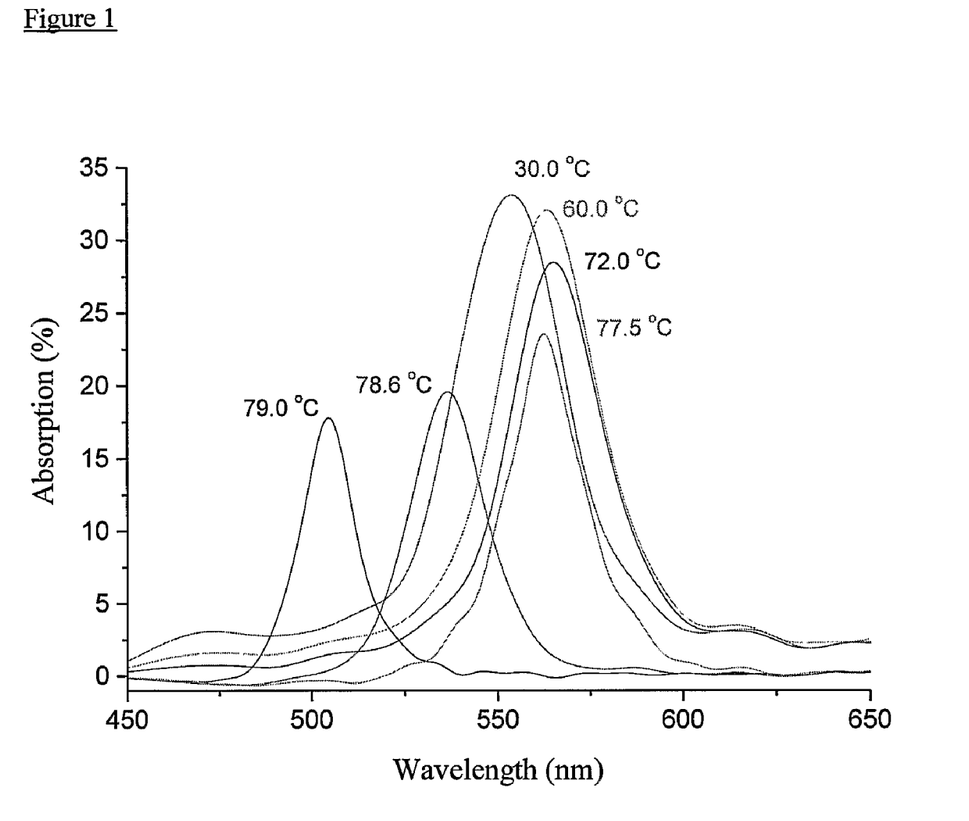
FIG. 1 is a graph showing % of light reflected by the cell of blue phase liquid crystalline material of Example 1 against wavelength at certain temperatures.

From FIG. 1, it will be seen that the liquid crystalline material showed a peak of reflection at about 505 nm at 79.0° C. and about 540 nm at 78.6° C., before the liquid crystalline material has cooled to fully form the blue phase and peaks of reflection at 550-570 nm for the blue phase liquid crystalline material at lower temperatures. The maximum reflectance increases with decreasing temperature of the blue phase.

Figure 2:
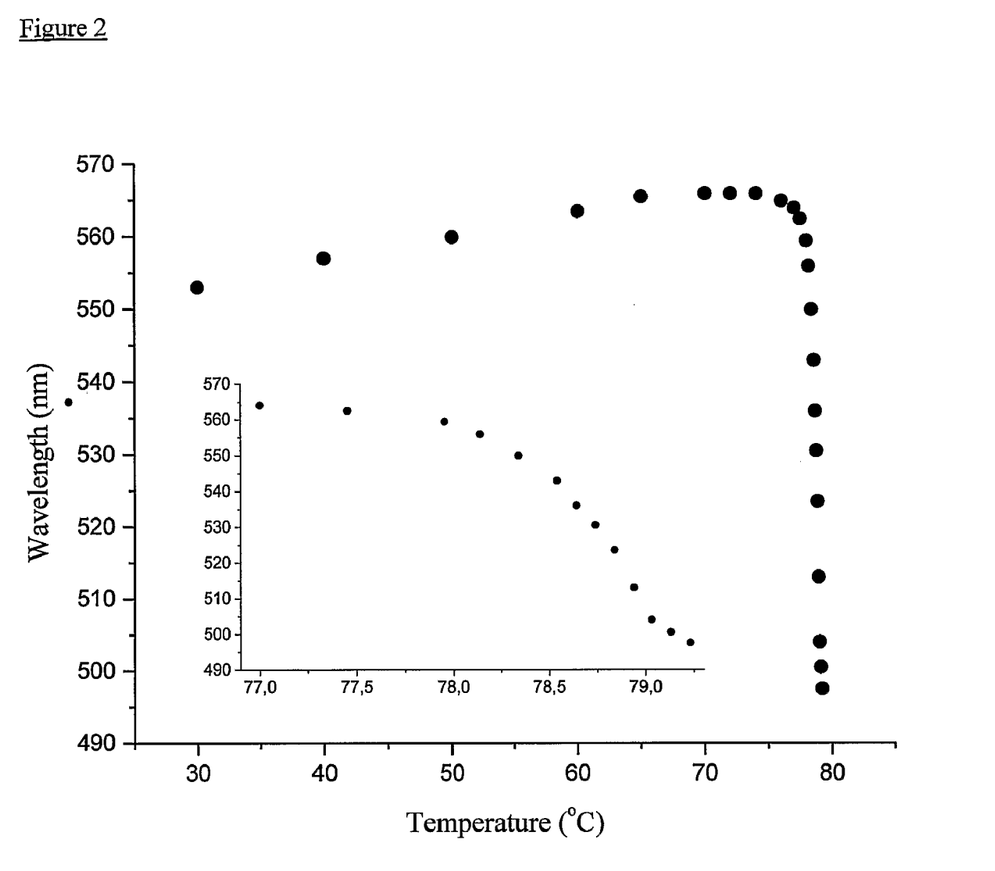
FIG. 2 is a graph showing the wavelength of maximum reflection against temperature for the blue phase liquid crystalline material of Example 1.

From FIG. 2, it will be seen that the wavelength of maximum reflection increases from about 553 nm at 30° C. to about 567 nm at 75° C. and then changes rapidly to below 500 nm at temperatures above 79° C. The variance of wavelength of maximum reflection against temperature in the range 77 to 79.5° C. is shown in more detail in the inset of FIG. 2.

Figure 3:
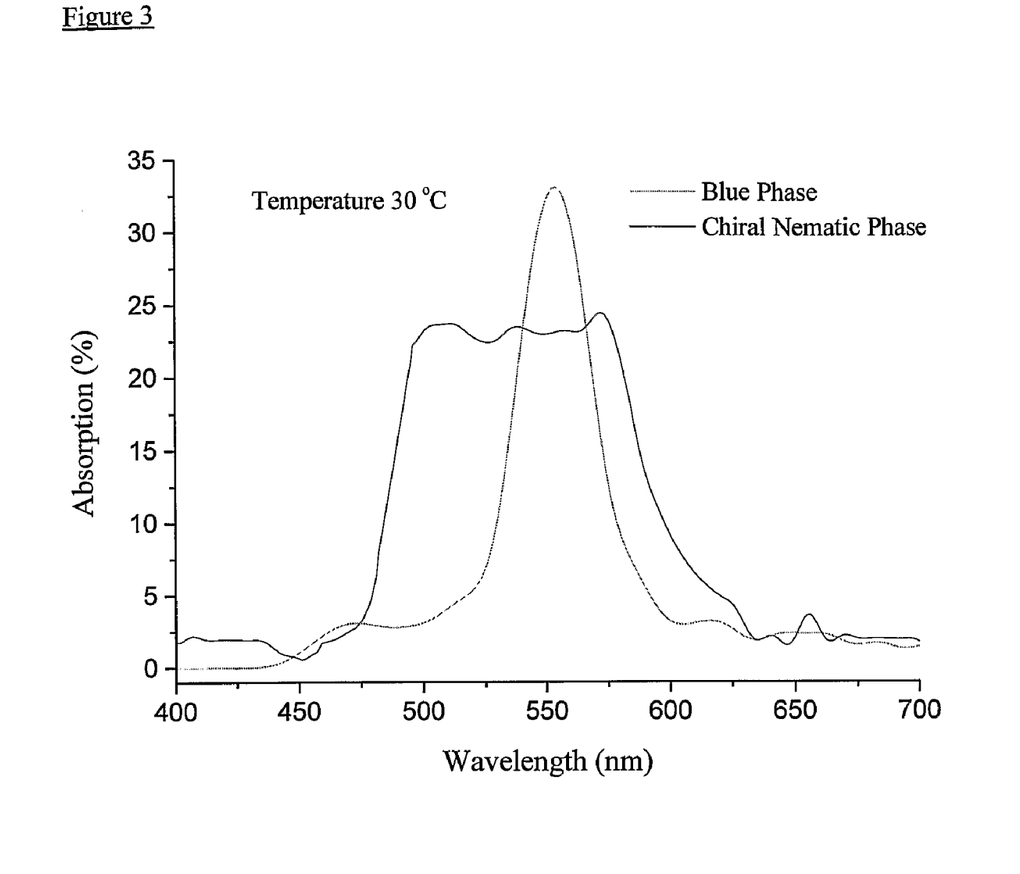
FIG. 3 is a graph showing % of light reflected by the cell of blue phase liquid crystalline material of Example 1 against wavelength at 30° C. superimposed on a graph showing % of light reflected by a cell of chiral nematic phase liquid crystalline material of the same composition at 30° C.

From FIG. 3, it will be seen that the maximum reflection by the blue phase liquid crystalline material at 30° C. is higher than the maximum reflection by the chiral nematic phase liquid crystalline material of the same composition at 30° C. and that high reflection by the blue phase occurs over a much narrower wavelength band.

Figure 4:
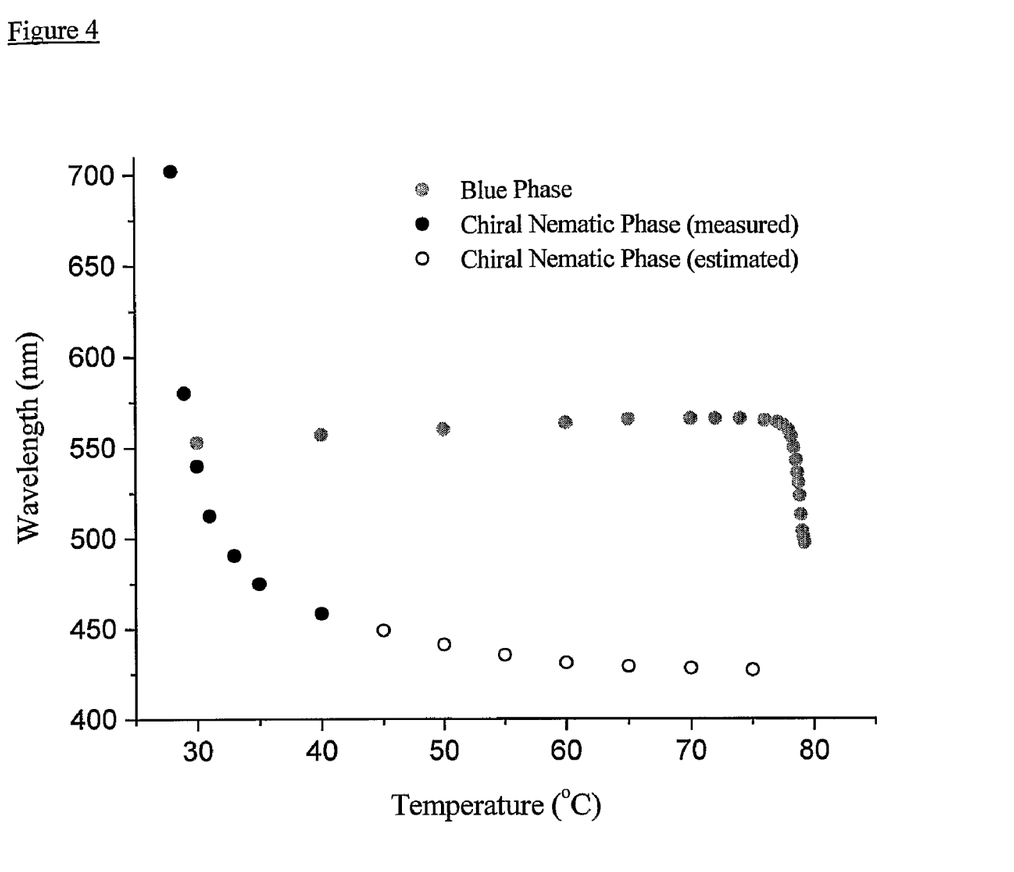
FIG. 4 is a graph showing the wavelength of maximum reflection against temperature of the blue phase liquid crystalline material of Example 1 superimposed on the wavelength of maximum reflection of the chiral nematic phase liquid crystalline material of the same composition.

From FIG. 4 it will be seen that the variance of wavelength of maximum reflection with temperature of the blue phase liquid crystalline material is entirely different from the variance of wavelength of maximum reflection with temperature of the chiral nematic phase liquid crystalline material of the same composition.

Figure 5:
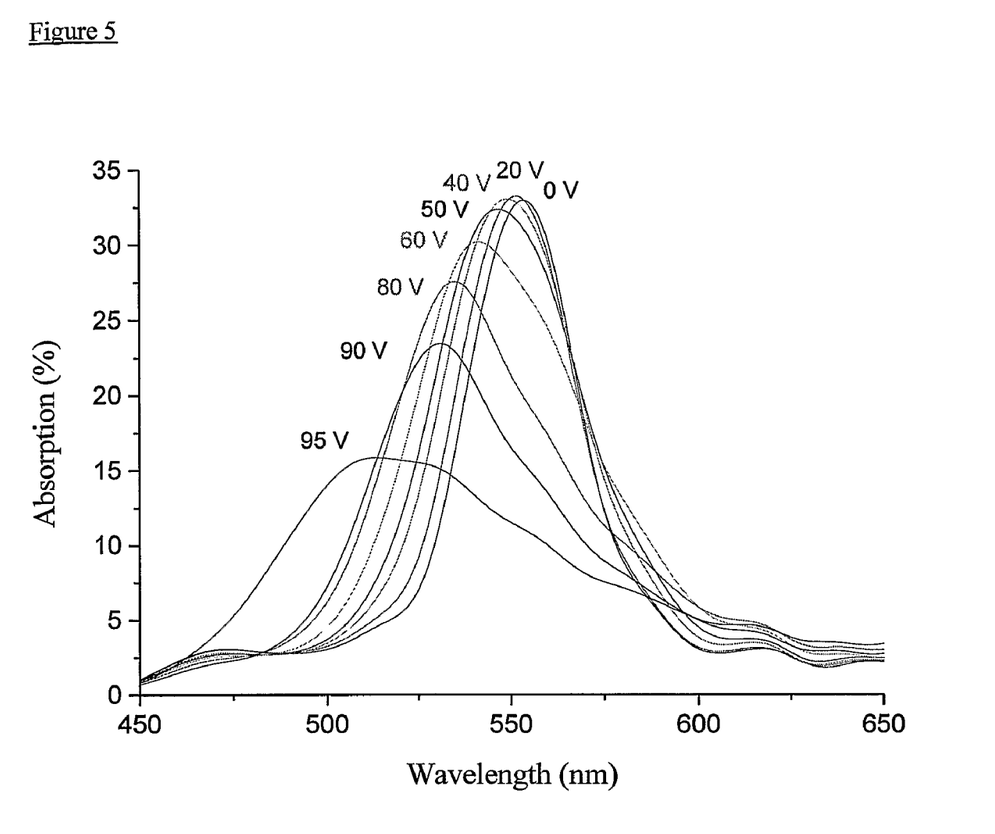
FIG. 5 is a graph showing % of light reflected by the cell of blue phase liquid crystalline material of Example 1 against wavelength at 30° C. with different voltages of 0, 20, 40, 50, 60, 80, 90 and 95V applied across electrodes attached to the glass plates.

From FIG. 5 it is seen that maximum reflection by the blue phase is highest when the applied electric field is 40 volts or less, with no sharp peak of reflection against wavelength when the voltage is as high as 95V. The wavelength of maximum reflection decreases with applied voltage.

EXAMPLE 2

The mixture of liquid crystalline materials of Example 1 was sealed in a conventional polyimide cell with strong planar alignment as a layer 3 μm thick and was heated to above 80° C. to form the isotropic phase and was cooled below 80° C. at 0.5° C. per minute. Formation of a blue phase was detected at 78.5° C. This blue phase was stable at temperatures below 78° C. down to 70.5° C.

EXAMPLES 3 TO 21

Various mixtures of at least one bimesogenic nematic compound and a chiral compound, as set out in Table 1 below, were sealed between non-treated glass plates as a layer 25 μm thick and heated to form the isotropic phase. The mixture was cooled at 0.5° C. per minute. Formation of a blue phase was detected by polarising microscopy. The phase transition temperature was noted. The experiment was repeated, cooling the mixture from a temperature just above the phase transition temperature at 0.01° C. per minute while measuring the wavelength of maximum reflection. From a temperature about 1° C. below formation of the blue phase, the wavelength of maximum reflection remained substantially constant and cooling at 0.5° C. per minute was resumed. The phase transition temperature at which the blue phase disappeared was noted. For most of the mixtures, this was transition from the blue phase to the smectic phase, but in Examples 4, 5 and 6 the blue phase changed to a nematic phase.

Table 1 shows the amounts of bimesogenic nematic compounds and chiral additive used in each Example. In Table 1, the bimesogenic nematic compounds are identified as follows:

S4, S7, S9, S11 and S13 are the compounds of formula where the value of n is 4, 7, 9, 11 and 13 respectively.

N9 is the bismesogenic nematic dye compound and E9 is the bismesogenic nematic ester of formula The chiral nematic compounds are commercially available under the Trade Marks BDH1281 and BDH1305. BDH1281 is stated to have a HTP of 87 for a standard mixture of biphenyls and BDH1305 has a HTP of about 55.

TABLE 1

| Example | S4 | S7 | S9 | S11 | S13 | N9 | E9 | BDH1281 | BDH1305 |
|---------|------|------|------|-----|-----|-----|-----|---------|---------|
| 1 | | 10 | 40 | | | 50 | | 3.7 | |
| 3 | | | 50 | | | 50 | | 3.7 | |
| 4 | | | 100 | | | | | 3.7 | |
| 5 | | | | | 100 | | | 3.7 | |
| 6 | 25 | | 25 | | | 50 | | 3.8 | |
| 7 | | 28 | 28 | | | 44 | | 4.0 | |
| 8 | | 15 | 60 | | | 25 | | 4.7 | |
| 9 | | 18 | 72 | | | 10 | | 4.0 | |
| 10 | | | 72 | 18 | | 10 | | 3.1 | |
| 11 | | | 45 | | | 10 | 45 | 3.5 | |
| 12 | | 18 | 72 | | | 10 | | 3.0 | |
| 13 | | 19 | 76 | | | 5 | | 4.0 | |
| 14 | | 20 | 80 | | | | | 4.0 | |
| 15 | | 20 | 80 | | | | | 3.3 | |
| 16 | | 20 | 80 | | | | | 3.9 | |
| 17 | | 33 | 33 | 34 | | | | 4.0 | |
| 18 | | 25 | 25 | 25 | 25 | | | 3.9 | |
| 19 | | 19.5 | 78.7 | | | 1.8 | | 4.1 | |
| 20 | | 33 | 33 | 34 | | | | 3.35 | |
| 21 | | 50 | 50 | | | | | | 5.1 |

The phase transition temperatures of the mixtures of Examples 3 to 21 are shown in Table 2, in which Sm=smectic phase
Ts=temperature of transition from blue phase to smectic phase
N*=chiral nematic phase
Tn=temperature of transition from blue phase to chiral nematic phase
BP=blue phase
Tb=temperature of transition from isotropic phase to blue phase
I=isotropic phase

TABLE 2

| Example | Sm | Ts | N* | Tn | BP | Tb | I |
|---------|----|----|-----|-----|-----|------|----|
| 1 | • | 36 | — | — | • | 78.5 | • |
| 3 | • | 35 | — | — | • | 93.5 | • |
| 4 | | | • | 47-52 | • | 59 | • |
| 5 | | | • | 110-118 | • | 128 | • |
| 6 | | | • | 99 | • | 106.5 | • |
| 7 | • | 38 | — | — | • | 86.6 | • |
| 8 | • | 28 | — | — | • | 72.9 | • |
| 9 | • | 21.5 | — | — | • | 64 | • |
| 10 | • | 28 | — | — | • | 67 | • |
| 11 | • | 30.5 | — | — | • | 75 | • |
| 12 | • | 21 | — | — | • | 64.3 | • |
| 13 | • | 20 | — | — | • | 64 | • |
| 14 | • | <20 | — | — | • | 57.5 | • |
| 15 | • | <20 | — | — | • | 57.7 | • |
| 16 | • | <20 | — | — | • | 57.5 | • |
| 17 | • | 16 | — | — | • | 57.0 | • |
| 18 | • | 15 | — | — | • | 57.5 | • |

TABLE 2-continued

| Example | Sm | Ts | N* | Tn | BP | Tb | I |
|---|---|---|---|---|---|---|---|
| 19 | • | 18 | — | — | • | 57.1 | • |
| 20 | • | 16 | — | — | • | 56.8 | • |
| 21 | • | <20 | — | — | • | 41.5 | • |

Phase transition temperatures are in ° C.
• means that phase exists;
— means that phase does not exist for this particular mixture at the particular conditions used to prepare the blue phase i.e. cooling temperature rate, cell thickness, surface treatment, etc.

The process of Example 17 was repeated using a cooling temperature of 0.001° C./minute in the region of the phase transition temperature from isotropic phase to blue phase. The blue phase was heated at 0.01° C./minute to the isotropic phase, then cooled at 0.001° C./minute.

Figure 6:
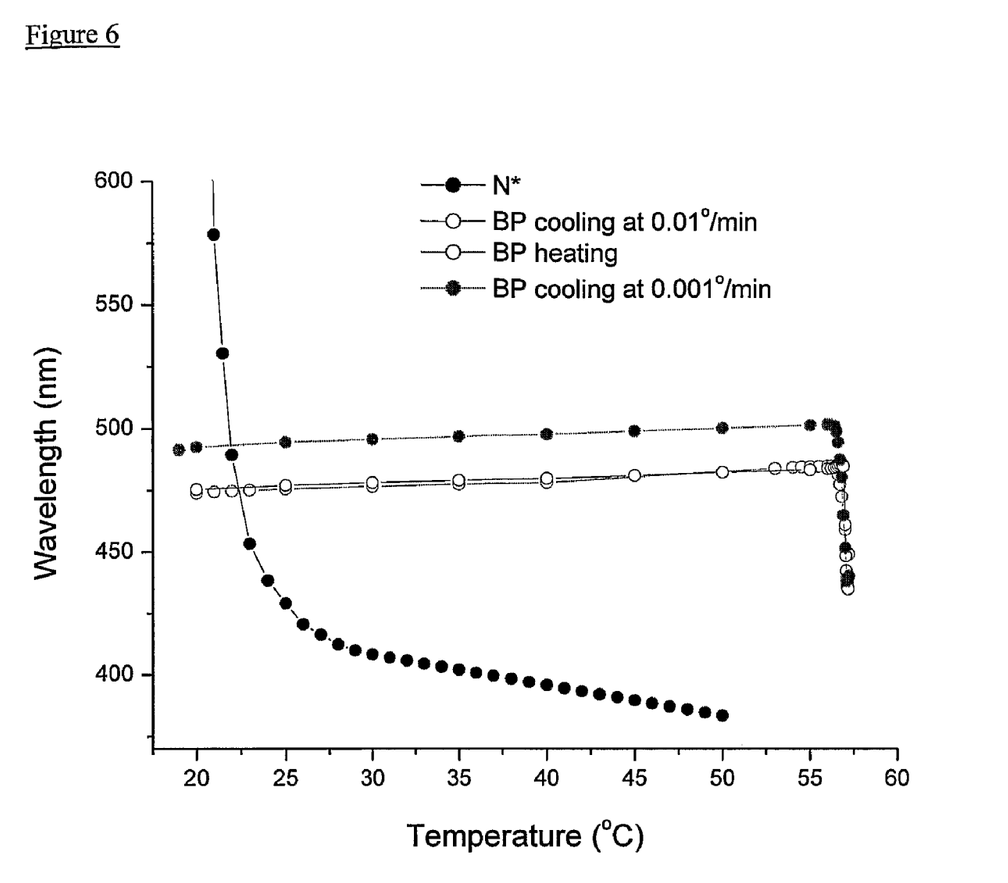
FIG. 6 is a graph showing the wavelength of maximum reflection against temperature of the blue phase liquid crystalline material of Example 17 superimposed on the wavelength of maximum reflection of the chiral nematic phase liquid crystalline material of the same composition.
Figure 7:
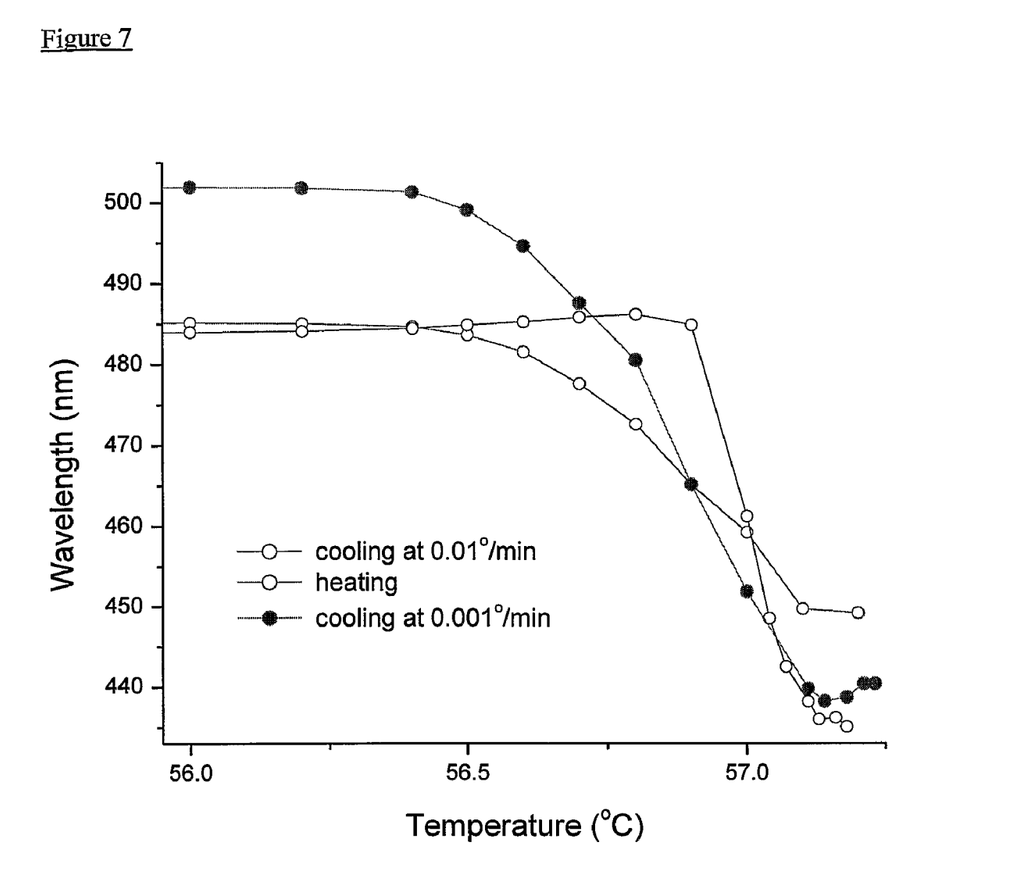
FIG. 7 is a graph showing the wavelength of maximum reflection against temperature of the blue phase liquid crystalline material of Example 17 between 57.5° C. and 56.0° C. (the temperature of blue phase formation) in more detail.

From FIGS. 6 and 7, it can be seen that the wavelength of maximum reflection of the blue phase liquid crystalline material follows substantially the same curve against temperature for cooling the isotropic phase at 0.01° C. to form the blue phase and for reheating the blue phase to the isotropic phase, but the wavelength of maximum reflectance is significantly increased (502 nm compared to 488 nm) when the isotropic phase is cooled at 0.001° C. to form the blue phase.

Figure 8:
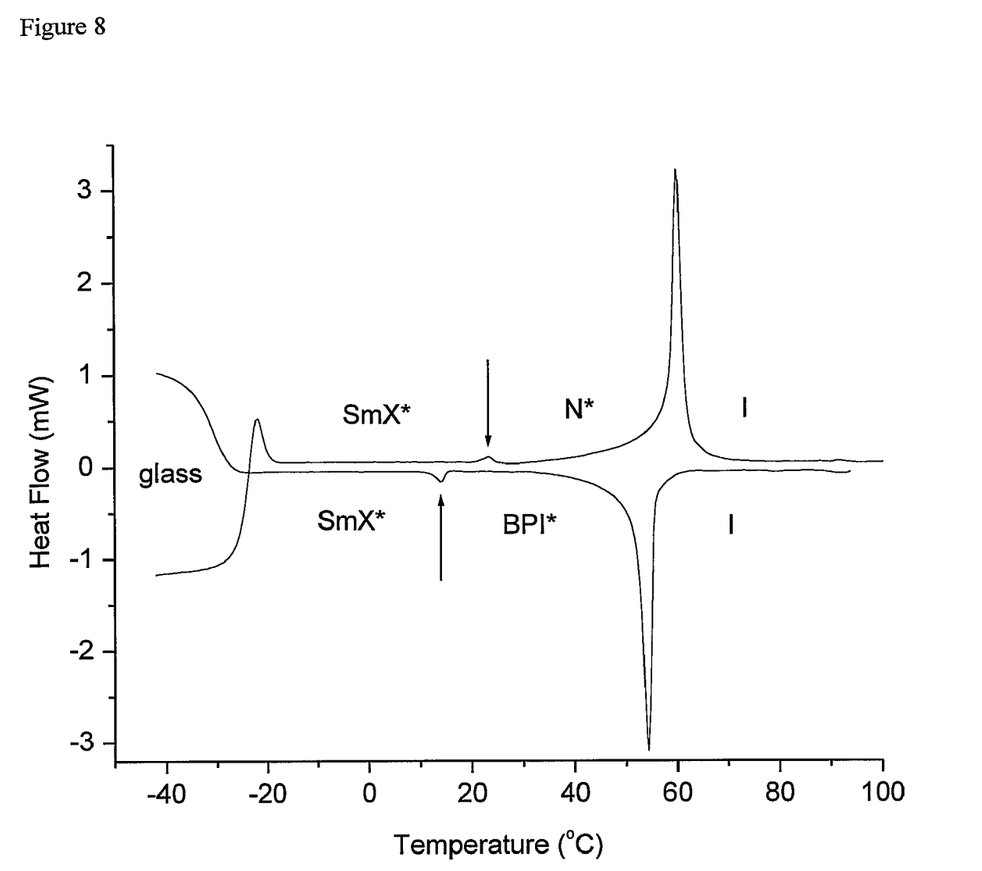
FIG. 8 is a Differential Scanning Calorimetry spectrum showing the phase sequence for the formulation described in Example 17, with heating and cooling rates of 20 C./min.

In FIG. 8, the phase transition between the smectic phase SmX and the chiral nematic phase N* on heating, and the phase transition between the blue phase BP and the smectic phase SmX on cooling, are marked with arrows.

The invention claimed is:

1. A blue phase liquid crystalline material comprising a mixture comprising at least one bimesogenic nematic compound and at least one chiral compound, wherein the material is capable of stable existence in the blue phase over a temperature range of at least 5° C., and a helical twisting power of the chiral compound multiplied by the proportion in which it is present in the mixture is in the range 3 to 5 $\mu m^{-1}$.

2. The blue phase liquid crystalline material according to claim 1, wherein the mixture comprises at least two bimesogenic nematic compounds and at least one chiral compound.

3. The blue phase liquid crystalline material according to claim 1, wherein each bimesogenic nematic compound has the formula M-A-M', wherein A is a flexible chemical linkage and each of M and M' is a mesogen comprising at least 2 aromatic, heterocyclic or cycloaliphatic nuclei joined by a linkage which is more rigid than the flexible chemical linkage A.

4. The blue phase liquid crystalline material according to claim 1, wherein the bimesogenic nematic compound includes at least one compound containing a chromophore.

5. The blue phase liquid crystalline material according to claim 1, wherein the chiral compound is a chiral nematic compound.

6. The blue phase liquid crystalline material according to claim 1, wherein the chiral compound forms 1 to 10% by weight of the liquid crystalline material.

7. An optical device comprising a layer of a blue phase liquid crystalline material according to claim 1 enclosed between opposed carrier plates, an AC voltage source operationally connected to the carrier plates and a light source positioned to impinge a beam of light onto the layer of blue phase liquid crystalline material in a direction substantially normal to the plates.

8. A process of mirrorless lasing comprising subjecting a blue phase liquid crystalline material according to claim 1 to high energy pulsed radiation at a wavelength in the visible spectrum.

9. A slotted monolithic optical waveguide comprising an electro-optically active material positioned in a slot between two portions of the waveguide and electrodes deployed above the slot to adjust the phase of light travelling in the waveguide, wherein the electro-optically active material is a blue phase liquid crystalline material according to claim 1.

10. A process for the preparation of a blue phase liquid crystalline material which is capable of stable existence in the blue phase over a temperature range of at least 5° C., the process comprising cooling a mixture of at least one bimesogenic nematic compound and at least one chiral compound from the isotropic state, wherein a helical twisting power of the chiral compound multiplied by the proportion in which it is present in the mixture is in the range 3 to 5 $\mu m^{-1}$.

11. A blue phase liquid crystalline material produced by the process according to claim 10.

12. A process for the preparation of a blue phase liquid crystalline material which is capable of stable existence in the blue phase over a temperature range of at least 5° C., the process comprising cooling a mixture comprising a bimesogenic chiral nematic compound from the isotropic state, wherein a helical twisting power of the bimesogenic chiral nematic compound multiplied by the proportion in which it is present in the mixture is in the range 3 to 5 $\mu m^{-1}$.

13. A blue phase liquid crystalline material produced by the process according to claim 12.

* * * * *